United States Patent
Aulanko et al.

(10) Patent No.: US 6,956,309 B2
(45) Date of Patent: Oct. 18, 2005

(54) FASTENING OF THE STATOR OF A FLAT ELEVATOR MOTOR

(75) Inventors: Esko Aulanko, Kerava (FI); Jorma Mustalahti, Hyvinkää (FI); Jussi Huppunen, Lappeenranta (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 10/923,868

(22) Filed: Aug. 24, 2004

(65) Prior Publication Data

US 2005/0023926 A1 Feb. 3, 2005

Related U.S. Application Data

(63) Continuation of application No. PCT/FI03/00284, filed on Apr. 14, 2003.

(30) Foreign Application Priority Data

Apr. 17, 2002 (FI) .............................................. 20020740

(51) Int. Cl.[7] .................................................. H02K 1/22
(52) U.S. Cl. ........................ 310/67 R; 310/64; 310/254
(58) Field of Search ................................ 310/67 R, 254, 310/52, 54, 58, 64

(56) References Cited

U.S. PATENT DOCUMENTS

| | | | |
|---|---|---|---|
| 3,742,595 A | * 7/1973 | Lykes ........................ 29/596 |
| 4,689,512 A | 8/1987 | Kuivamaki | |
| 5,877,576 A | * 3/1999 | CoChimin ................... 310/254 |
| 5,962,948 A | 10/1999 | Hakala et al. ............... 310/268 |
| 5,982,060 A | * 11/1999 | Hakala et al. ............. 310/67 R |
| 6,181,038 B1 | * 1/2001 | Van Rooij .................... 310/89 |
| 6,445,095 B1 | * 9/2002 | Liang et al. ................... 310/64 |

FOREIGN PATENT DOCUMENTS

| | | | |
|---|---|---|---|
| FR | 0 327 338 A2 | 8/1989 | ............ H02K/9/22 |
| FR | 2 787 941 A3 | 6/2000 | ............ H02K/1/18 |

* cited by examiner

Primary Examiner—Darren Schuberg
Assistant Examiner—Nguyen Hanh
(74) Attorney, Agent, or Firm—Harness Dickey & Pierce, P.L.C.

(57) ABSTRACT

A stator fastening arrangement for a flat elevator motor may include a stator core, a winding, and a rotor fitted in conjunction with the stator. The stator may be fitted within a mounting part fastened to a motor body. A space provided between the mounting part and the stator may be filled with a thermally conductive filling material for conducting heat away from the stator to the mounting part. The filling material may be provided on one or more axial, outer circumferential surfaces of the stator and in contact with the mounting part so as to fasten the stator to the mounting part.

6 Claims, 1 Drawing Sheet

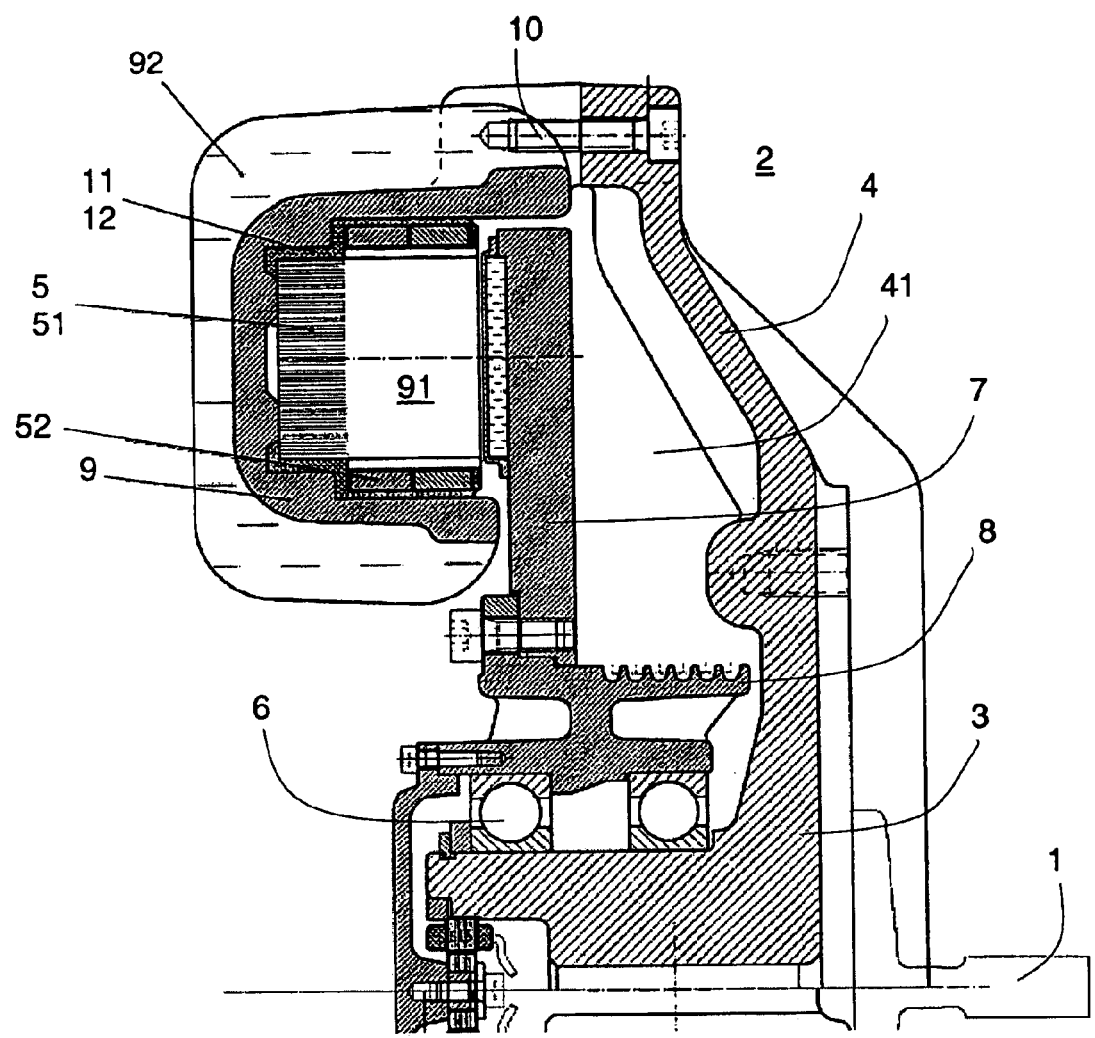

FASTENING OF THE STATOR OF A FLAT ELEVATOR MOTOR

This application is a continuation of PCT/FI03/00284 filed on Apr. 14, 2003.

BACKGROUND OF THE INVENTION

1. Field of the Invention

The present invention relates generally to a stator fastening arrangement for a flat elevator motor.

2. Description of the Related Art

The physical dimensions of an elevator machine may be relevant to the size of the elevator shaft and/or building, depending on where the machine is located. If the elevator machine is placed in the elevator shaft or beside it, the thickness of the elevator machine may be substantially important in relation to the available space required.

U.S. Pat. No. 5,962,948 is directed to an elevator machine designed to be placed in the elevator shaft and having a flat, discoid elevator motor which includes a stator and a rotor. The rotor may include a rotor disc provided with permanent magnets, and may have a traction sheave mounted thereon. The stator may include a stator core and windings. The stator may be fastened between the motor body and the rotor by a screw fastening technique.

SUMMARY OF THE INVENTION

An example embodiment of the present invention is directed to a stator fastening arrangement for a flat elevator motor having a motor body provided with a stator. The arrangement may include a stator core, a winding, and a rotor fitted in conjunction with the stator. The stator may be fitted within a mounting part fastened to the motor body. A space provided between the mounting part and the stator may be filled with a thermally conductive filling material for conducting heat away from the stator to the mounting part. The filling material may be provided on one or more axial, outer circumferential surfaces of the stator and in contact with the mounting part so as to fasten the stator to the mounting part.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the exemplary embodiments of the present invention.

The FIGURE illustrates a stator fastening arrangement for a flat elevator motor having a motor body provided with a stator, in accordance with an example embodiment of the present invention.

DETAILED DESCRIPTION OF THE EXAMPLE EMBODIMENTS

Referring to the FIGURE, there is illustrated an example stator fastening arrangement for a flat elevator motor having a motor body provided with a stator. As shown, there is a flat, discoid elevator motor 2 which may be useable in a gearless, elevator machine placed in relative close proximity to a guide rail 1. Motor 2 may include a disc 4 formed in the motor body 3 and a stator 5 fastened to the disc 4. The stator 5 may include a winding core 51 and a plurality of windings 52. A round, rotor 7 and a traction sheave 8 may be mounted via bearings 6 on the body 3. As shown in the FIGURE, the disc 4 may include a recess 41 formed for the rotor 7 on an inner side thereof.

The stator 5 may be mounted outside the rotor 7, i.e. on the opposite side of the disc 4 in a trough 91 of a trough-shaped mounting part 9. Mounting part 9 may be made of aluminum, for example. The mounting part 9 may be fastened to the disc 4 with fastening means such as screws 10 at an outer edge thereof. The mounting part 9 may be provided with cooling fins 92 on an outside edge or circumference thereof, as shown in the FIGURE. A space 11, which may be provided between the windings 52 and the mounting part 9, may be filled with a resin 12 having a desired thermal conductivity. Thus, the windings 52 and its winding ends may be effectively cooled within the mounting part 9. The resin 12 may also bind the stator 5 fast to the mounting part 9, so that no additional fastening elements are needed.

Accordingly, the example embodiment of the present invention provides a stator fastening arrangement for a flat elevator motor having a motor body provided with a stator. The arrangement may be configured to fasten the stator to the body of the motor so as to improve the cooling of the stator and to achieve a substantially compact stator structure, as compared with prior art stator structures.

As shown in the FIGURE, the stator may be thus fitted inside a trough-like mounting part, with a space between the stator winding and mounting part filled with a thermally conducting filler. The filler thus serves to conduct heat away from the stator and to the mounting part.

The example embodiment may make it possible to achieve an economical, simple and reliable stator fastening arrangement. In addition, efficient cooling and consequently a high power density as well may be achieved. The insulating gaps (spaces) may be smaller than prior art solutions, allowing the elevator motor to be made shorter in the axial direction relative to prior art motors. This is desirable, especially when designing elevator motors for placement in the elevator shaft. In addition, the use of a filler may substantially prevent and/or eliminate soiling of the stator windings. Therefore, a protection rating of the motor can be raised. Moreover, the mounting part and the stator form a single contiguous or integral unit, which may provide a rigid and firm structure.

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

We claim:

1. A stator fastening arrangement for a flat elevator motor having a motor body—provided with a stator,—comprising:
    a stator core;
    a winding, and
    a rotor—fitted in conjunction with the stator,
    wherein
        the stator—is fitted within a mounting part—fastened to the motor body,
        a space provided between the mounting part and the stator—is filled with a thermally conductive filling material for conducting heat away from the stator to the mounting part, and
        the filling material is provided on one or more axial, outer circumferential surfaces of the stator and in contact with the mounting part so as to fasten the stator to the mounting part.

2. The fastening arrangement of claim 1, wherein the filling material is embodied as a castable resin material.

3. The fastening arrangement of claim 1,—wherein the mounting part—is fastened to the motor body—at an outer edge thereof by one or more fastening elements, and the stator is disposed on an opposite side of the motor body—relative to the rotor.

4. The fastening arrangement of claim 1, wherein the mounting part—is composed of aluminum.

5. The fastening arrangement of claim 1, wherein the mounting part includes cooling fins.

6. The fastening arrangement of claim 1, wherein the electric motor is embodied as a discoid elevator motor.

* * * * *